US012548895B2

(12) United States Patent
Isogai et al.

(10) Patent No.: US 12,548,895 B2
(45) Date of Patent: Feb. 10, 2026

(54) ELECTRIC WAVE TRANSMISSION DEVICE AND WIRELESS COMMUNICATION SYSTEM

(71) Applicant: SEIKO GROUP CORPORATION, Tokyo (JP)

(72) Inventors: Ryosuke Isogai, Matsudo (JP); Yoshifumi Yoshida, Matsudo (JP)

(73) Assignee: SEIKO GROUP CORPORATION, Tokyo (JP)

( * ) Notice: Subject to any disclaimer, the term of this patent is extended or adjusted under 35 U.S.C. 154(b) by 147 days.

(21) Appl. No.: 18/290,424

(22) PCT Filed: Jul. 12, 2022

(86) PCT No.: PCT/JP2022/027434
§ 371 (c)(1),
(2) Date: Nov. 13, 2023

(87) PCT Pub. No.: WO2023/002888
PCT Pub. Date: Jan. 26, 2023

(65) Prior Publication Data

US 2024/0250419 A1 Jul. 25, 2024

(30) Foreign Application Priority Data

Jul. 21, 2021 (JP) ................................ 2021-120931
May 16, 2022 (JP) ................................ 2022-080150

(51) Int. Cl.
*H01Q 1/52* (2006.01)
*H01Q 1/38* (2006.01)

(52) U.S. Cl.
CPC ................ *H01Q 1/52* (2013.01); *H01Q 1/38* (2013.01)

(58) Field of Classification Search
None
See application file for complete search history.

(56) References Cited

U.S. PATENT DOCUMENTS

2010/0109966 A1* 5/2010 Mateychuk .............. H01Q 9/42 427/2.24
2014/0273824 A1* 9/2014 Fenner ................ H04L 63/0823 455/41.1
2016/0190698 A1* 6/2016 Andresen ............. H01Q 9/0442 343/749

FOREIGN PATENT DOCUMENTS

CN 108448233 A 8/2018
EP 1707105 A1 10/2006
(Continued)

OTHER PUBLICATIONS

Bappaditya Mandal et al, Low Profile Implantable Antenna for Fat Intra-Body Communication,2020 14th European Conference on Antennas and Propagation (EUCAP), EURAAP, Mar. 15, 2020, pp. 1-4 (Year: 2020).*
(Continued)

*Primary Examiner* — Crystal L Hammond
(74) *Attorney, Agent, or Firm* — Crowell & Moring LLP

(57) ABSTRACT

An electric wave transmission device includes an electronic device having a circuit board on which an electric wave transmission circuit is formed and a dielectric layer, in which the electric wave transmission circuit has a high frequency control unit, a feeder line, and an antenna, the high frequency control unit supplies a high-frequency signal in one or more frequency bands to the antenna via the feeder line, the feeder line and the antenna are covered with the dielectric layer, the dielectric layer protects the electric wave transmission device such that the electric wave transmission device is in a usable state while being in contact with water, sea water, an electrolytic solution, or a substance or a tissue containing a certain amount of moisture, and a wiring length of the feeder line is equal to or less than 35 mm.

11 Claims, 5 Drawing Sheets

(56) References Cited

FOREIGN PATENT DOCUMENTS

| | | | |
|---|---|---|---|
| JP | 2006-297080 | A | 11/2006 |
| JP | 2009-268797 | A | 11/2009 |
| JP | 2019-530328 | A | 10/2019 |
| KR | 10-2021-0054729 | | 5/2021 |
| WO | WO 2018/051328 | A1 | 3/2018 |

OTHER PUBLICATIONS

The Extended/Supplementary European Search Report issued in European Application No. 22845822.0, dated Mar. 17, 2025 (12 pages).

Mandal, Bappaditya, et al.; "Low Profile Implantable Antenna for Fat Intra-Body Communication", 2020 14$^{th}$ European Conference on Antennas and Propagation (EUCAP), EURAAP, Mar. 15, 2020, pp. 1-4, XP033789090, DOI: 10.23919/EUCAP48036.2020.9135606 (4 pages).

Asan, Noor Badariah, et al.; "Reliability of the Fat Tissue Channel for Intra-body Microwave Communication" 2017 IEEE Conference on Antenna Measurements & Applications (CAMA), IEEE, Dec. 4, 2017, pp. 310-313 XP033308757, DOI: 10.1109/CAMA.2017.8273435 (4 pages).

International Search Report in Application No. PCT/JP2022/027434, dated Sep. 20, 2022, 4 pages.

* cited by examiner

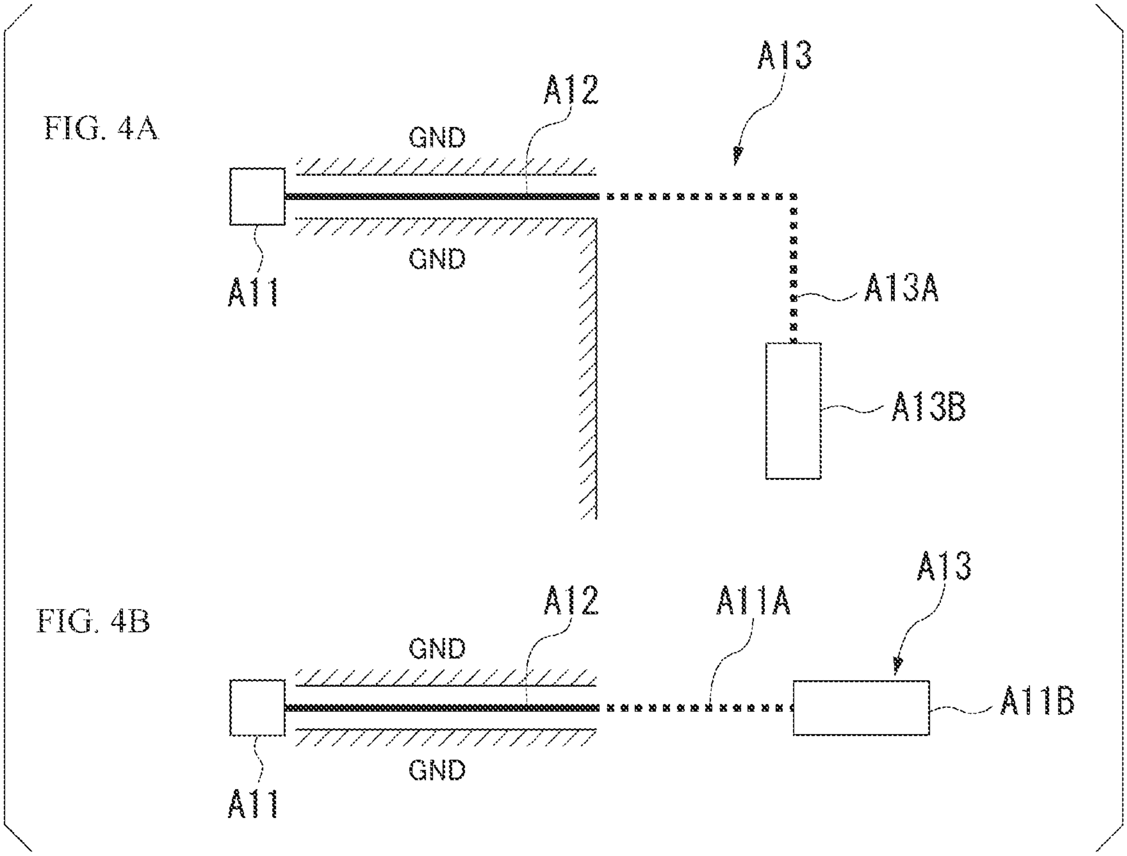
FIG. 5
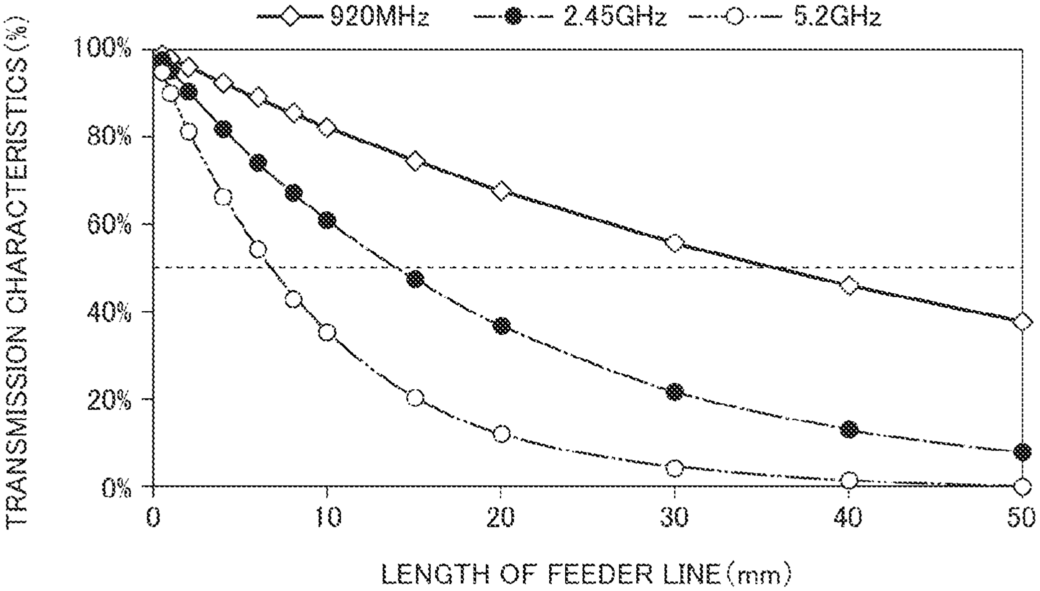

ELECTRIC WAVE TRANSMISSION DEVICE AND WIRELESS COMMUNICATION SYSTEM

RELATED APPLICATIONS

This application is a 371 application of PCT/JP2022/027434 having an international filing date of Jul. 12, 2022, which claims priority to Japanese Patent Application No. 2021-120931, filed Jul. 21, 2021, and Japanese Patent Application No. 2022-080150, filed May 16, 2022, the entire content of each of which is incorporated herein by reference.

TECHNICAL FIELD

The present invention relates to an electric wave transmission device and wireless communication system.

BACKGROUND ART

Conventionally, there has been known a capsule-type medical device that includes an imaging unit and a transmission unit that wirelessly transmits image information inside a test subject imaged by the imaging unit to the outside via a transmission antenna (refer to, for example, Patent Document 1). A capsule-type medical device described in Patent Document 1 floats on a liquid surface of a liquid inside the test subject.

Incidentally, although Patent Document 1 describes an effect of a dielectric constant in water and an antenna design, it does not describe dielectric loss.

CITATION LIST

Patent Literature

Patent Document: Japanese Unexamined Patent Application, First Publication No. 2009-268797

SUMMARY

Technical Problem

It is known that radio waves are attenuated by the conductivity of a substance in wireless communication in water, sea water, and other substances with high water content. In order to efficiently transmit radio waves in such an environment, a radio wave transmission method is devised (antenna design) according to the dielectric constant or conductivity of the surrounding environment. In addition, such devices generally have a form in which a dielectric (insulator) surrounds the periphery as a protective layer or a housing for waterproofing (refer to, for example, Patent Document 1).

As long as the protective layer or the housing is sufficiently thick and a board is sufficiently isolated from the surrounding environment, only the propagation loss of radio waves in water needs to be considered, as in the prior art. On the other hand, when the protective layer or housing is made thinner to make the device thinner and smaller, in addition to the propagation loss of radio waves, a high-frequency signal flowing through a high-frequency wiring of the board may also be affected by the surrounding environment (hereafter, an effect of the surrounding environment on a high-frequency signal flowing through the feeder line is referred to as "surrounding environment relative sensitivity"). Specifically, when the surrounding environment is water, sea water, an electrolytic solution, or a substance or a tissue that contains a certain amount of moisture, a dielectric loss tangent of the surrounding environment is high, so that the high-frequency signal flowing on the board is attenuated by the dielectric loss. For this reason, when the same high-frequency electric power is supplied, an intensity of radio waves emitted from the antenna is weakened, and it is necessary to supply more electric power than originally intended to maintain the radio wave intensity. Furthermore, when the propagation distance of radio waves can be short, the contribution of the dielectric loss of high-frequency signals is greater than the propagation loss of radio waves, so that high-frequency wiring design that takes the dielectric loss tangent into account is required.

In view of the points described above, it is an object of the present invention to provide an electric wave transmission device and a wireless communication system that can suppress the attenuation of high-frequency signals due to dielectric loss and efficiently transmit radio waves even when the dielectric loss tangent of the surrounding environment is high.

Solution to Problem

According to one aspect of the present invention, an electric wave transmission device includes an electronic device having a circuit board on which an electric wave transmission circuit is formed and a dielectric layer, in which the electric wave transmission circuit has a high frequency control unit, a feeder line, and an antenna, the high frequency control unit supplies a high-frequency signal in one or more frequency bands to the antenna via the feeder line, the feeder line and the antenna are covered with the dielectric layer, the dielectric layer protects the electric wave transmission device such that the electric wave transmission device is in a usable state while being in contact with water, sea water, an electrolytic solution, or a substance or a tissue containing a certain amount of moisture, and a wiring length of the feeder line is equal to or less than 35 mm.

According to the electric wave transmission device of one aspect of the present invention, even if the dielectric loss tangent of the surrounding environment is high, the wiring length of the feeder line (that is, the propagation length of the high-frequency signal) is set to 35 mm or less, whereby it is possible to suppress the attenuation of the high-frequency signal due to dielectric loss, and to efficiently transmit radio waves from the antenna.

In the electric wave transmission device according to one aspect of the present invention, the substance or the tissue containing a certain amount of moisture may contain 50% or more of moisture.

In this case, that is, when the electric wave transmission device is used in a state of being in contact with wood, a plant, or the like that contains 50% or more of moisture, the electric wave transmission device can efficiently transmit radio waves near the wood, plant, or the like.

In the electric wave transmission device according to one aspect of the present invention, the substance or the tissue containing a certain amount of moisture may be a body tissue of an animal or a human body.

In this case, that is, when the electric wave transmission device is used in a state of being in contact with the body tissue of an animal or a human body, the electric wave transmission device can effectively transmit radio waves near the animal or human body.

In the electric wave transmission device according to one aspect of the present invention, the electric wave transmission device may be used in a state of being in close proximity to the body tissue of an animal or a human body or in a state of being embedded in the body tissue of an animal or a human body.

In this case, that is, when the electric wave transmission device is used in a state of being in contact with the body tissue of an animal or a human body or in a state of being embedded in the body tissue of an animal or a human body, the electric wave transmission device can efficiently transmit radio waves near the animal or human body or in the animal or human body.

In the electric wave transmission device according to one aspect of the present invention, a thickness of the dielectric layer may also be equal to or less than 0.5 mm.

When the thickness of the dielectric layer covering the feeder line and antenna is equal to or less than 0.5 mm, the electric wave transmission device can be decreased in size while an efficiency of transmitting radio waves is maintained.

In the electric wave transmission device according to one aspect of the present invention, a frequency of a high-frequency signal supplied from the high frequency control unit to the antenna via the feeder line may be equal to or less than 1 GHZ, and the wiring length of the feeder line may be equal to or less than 35 mm.

In the electric wave transmission device according to one aspect of the present invention, the thickness of the dielectric layer may be equal to or less than 0.2 mm.

In the electric wave transmission device according to one aspect of the present invention, the frequency of the high-frequency signal supplied from the high frequency control unit to the antenna via the feeder line may be equal to or less than 2.5 GHZ, and the wiring length of the feeder line may be equal to or less than 15 mm.

In the electric wave transmission device according to one aspect of the present invention, the thickness of the dielectric layer may be equal to or less than 0.25 mm.

In the electric wave transmission device according to one aspect of the present invention, the frequency of the high-frequency signal supplied from the high frequency control unit to the antenna via the feeder line may be equal to or less than 5.5 GHZ, and the wiring length of the feeder line may be equal to or less than 7 mm.

In the electric wave transmission device according to one aspect of the present invention, the thickness of the dielectric layer may be equal to or less than 0.4 mm.

In the electric wave transmission device according to one aspect of the present invention, the antenna may be a wiring antenna formed on the circuit board, and a total length of the feeder line and the wiring antenna may be equal to or less than 35 mm.

When the antenna is a wiring antenna formed on the circuit board, the same dielectric loss as the feeder line occurs, and therefore, it is possible to suppress the attenuation of the high-frequency signal at the antenna and to efficiently transmit radio waves from the antenna by setting the total length of the feeder line and the wiring antenna to 35 mm or less.

In the electric wave transmission device according to one aspect of the present invention, the antenna may be configured by a wiring antenna formed on the circuit board and a chip antenna containing a high dielectric constant material, and the total length of the feeder line and the wiring antenna may be equal to or less than 35 mm.

When the antenna is a composite antenna of the wiring antenna and the chip antenna, it is possible to suppress attenuation of the high-frequency signal at the antenna, and to efficiently transmit radio waves from the antenna by setting the total wiring length obtained by excluding the chip antenna (that is, the total length of the feeder line and the wiring antenna) to 35 mm or less.

According to another aspect of the present invention, a wireless communication system includes the electric wave transmission device described above, and a receiver configured to receive radio waves transmitted from the antenna, in which a distance between the antenna and the receiver is equal to or less than 50 cm.

In a case of short-distance transmission with an assumed transmission distance of radio waves being equal to or less than 50 cm, an attenuation of high-frequency signals due to dielectric loss becomes more conspicuous than the attenuation of radio waves simply due to the conductivity of the surrounding environment.

According to still another aspect of the present invention, an effect of limiting the wiring length can be made noticeable using the short-distance transmission.

According to still another aspect of the present invention, an electric wave transmission device includes an electronic device having a circuit board on which an electric wave transmission circuit is formed and a dielectric layer, in which the electric wave transmission circuit has a high frequency control unit, a feeder line, and an antenna, the high frequency control unit supplies a high-frequency signal in one or more frequency bands to the antenna via the feeder line, the feeder line and the antenna are covered with the dielectric layer, the dielectric layer protects the electric wave transmission device such that the electric wave transmission device is in a usable state while being in contact with water, sea water, an electrolytic solution, or a substance or a tissue containing a certain amount of moisture, and transmission characteristics T indicating a degree of a supply of the high-frequency signal flowing through the feeder line to the antenna without being attenuated after being affected by a surrounding environment in the feeder line, a loss factor S indicating a degree of attenuation of the high-frequency signal flowing through the feeder line after being affected by a surrounding environment in the feeder line, and a surrounding environment relative sensitivity F have a relationship shown by the following Equation (1).

[Math. 1]

$$T \geq \frac{S \times F}{4} \tag{1}$$

In the electric wave transmission device according to still another aspect of the present invention, the thickness of the dielectric layer may be equal to or less than 0.6 mm, a wavelength of the high-frequency signal flowing through the feeder line may be equal to or less than 400 mm, and a wiring length of the feeder line may be equal to or less than 50 mm.

In the electric wave transmission device according to still another aspect of the present invention, when the frequency of the high-frequency signal flowing through the feeder line is around 2.5 GHZ, the surrounding environment relative sensitivity F and a thickness t of the dielectric layer may have a relationship shown by the following Equation (2), and the transmission characteristics T and a length L of the feeder line may have a relationship shown by the following Equation (3).

[Math. 2]

$$F = 1 + \left( \frac{-1}{1 + 9e^{-18 \times t}} \right) \quad (2)$$

[Math. 3]

$$T = \frac{1}{0.0025L^2 + 0.04L + 1} \quad (3)$$

According to still another aspect of the present invention, a wireless communication system includes the electric wave transmission device described above, and a receiver configured to receive radio waves transmitted from the antenna, in which a distance between the antenna and the receiver is equal to or less than 50 cm.

Advantageous Effects of Invention

According to the present invention, it is possible to provide an electric wave transmission device and a wireless communication system that can suppress an attenuation of high-frequency signals due to dielectric loss and efficiently transmit radio waves even when a dielectric loss tangent of the surrounding environment is high.

BRIEF DESCRIPTION OF DRAWINGS

FIGS. 4A and 4B are diagrams which show an example of a relationship between a high frequency control unit, a feeder line, and an antenna of the electric wave transmission device of a third embodiment.

FIG. 5 is a diagram which shows transmission characteristics with respect to a length of the feeder line (a ratio of electric power supplied to the antenna to an intensity of a high-frequency signal output from the high frequency control unit).

DESCRIPTION OF EMBODIMENTS

Hereinafter, embodiments of the electric wave transmission device and the wireless communication system of the present invention will be described with reference to the drawings.

First Embodiment

Figure 1:
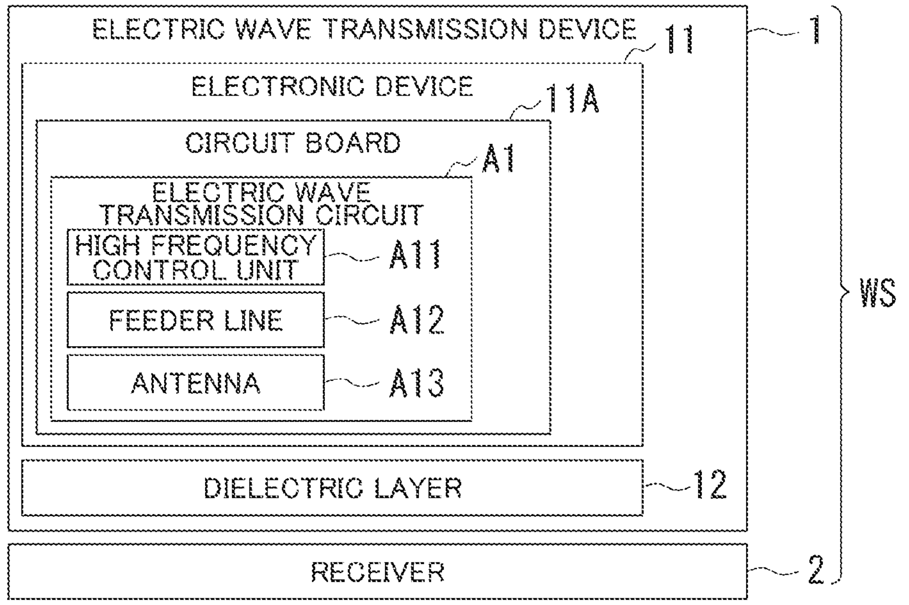
FIG. 1 is a diagram which shows an example of a wireless communication system according to a first embodiment.

FIG. 1 is a diagram which shows an example of a wireless communication system WS of a first embodiment.

In the example shown in FIG. 1, the wireless communication system WS includes an electric wave transmission device 1 and a receiver 2. The electric wave transmission device 1 transmits radio waves and the receiver 2 receives the radio waves transmitted by the electric wave transmission device 1.

The electric wave transmission device 1 includes an electronic device 11 and a dielectric layer 12. The electronic device 11 has a circuit board 11A on which an electric wave transmission circuit A1 is formed. The electric wave transmission circuit A1 has a high frequency control unit A11, a feeder line A12, and an antenna A13. The high frequency control unit A11 supplies a high-frequency signal in one or more frequency bands to the antenna A13 via the feeder line A12. The feeder line A12 supplies a high-frequency signal to the antenna A13, and is generally configured as a transmission line. The feeder line A12 is, for example, a microstrip line, a coplanar line, or the like. The feeder line A12 is a line designed not to emit radio waves, and the antenna A13 is designed to emit radio waves to the outside.

The feeder line A12 and the antenna A13 are covered with the dielectric layer 12.

When a medium with a high dielectric loss tangent is present in a vicinity of the feeder line A12, a high-frequency signal flowing through the feeder line A12 undergoes dielectric loss and is attenuated. The amount of attenuation at this time depends on a magnitude of the dielectric loss tangent, a distance between the feeder line A12 and the medium with a high dielectric loss tangent (a thickness of the dielectric layer 12 covering the feeder line A12), a frequency of the high-frequency signal, and the like. Examples of the medium with a high dielectric loss tangent include water, sea water, an electrolytic solution, and a substance, a tissue, or the like containing a certain amount (for example, 50% or more) of moisture (for example, a body tissue of an animal or a human body). A common point of these is that they generally contain a certain amount or more of water.

The electric wave transmission device 1 of the first embodiment is used with the dielectric layer 12 in contact with water, sea water, an electrolytic solution, or the substance, the tissue, or the like containing a certain amount of moisture. In other words, the dielectric layer 12 protects the electric wave transmission device 1 such that the electric wave transmission device 1 is in a usable state while being in contact with water, sea water, an electrolytic solution, or the substance, the tissue, or the like containing a certain amount of moisture.

To reduce the dielectric loss undergone by the high-frequency signal flowing through the feeder line A12, it is necessary to shorten the length of the feeder line A12 as much as possible. This is because dielectric loss indicates a constant amount of attenuation per unit length. On the other hand, in a general case of use in the air, not in a special environment such as water, there is no need to limit the length of the feeder line, and the feeder line needs a certain amount of length to ensure a degree of freedom in layout of other components on the board.

In view of these points, in the electric wave transmission device 1 of the first embodiment which is used with the dielectric layer 12 in contact with water, sea water, an electrolytic solution, or the substance, the tissue, or the like containing a certain amount of moisture, the wiring length of the feeder line A12 (that is, the propagation length of the high-frequency signal) is set to 35 mm or less. For this reason, according to the electric wave transmission device 1 of the first embodiment, even when the dielectric loss tangent of the surrounding environment is high, the attenuation of the high-frequency signal due to the dielectric loss can be suppressed, and radio waves can be efficiently transmitted from the antenna A13.

Figure 6:
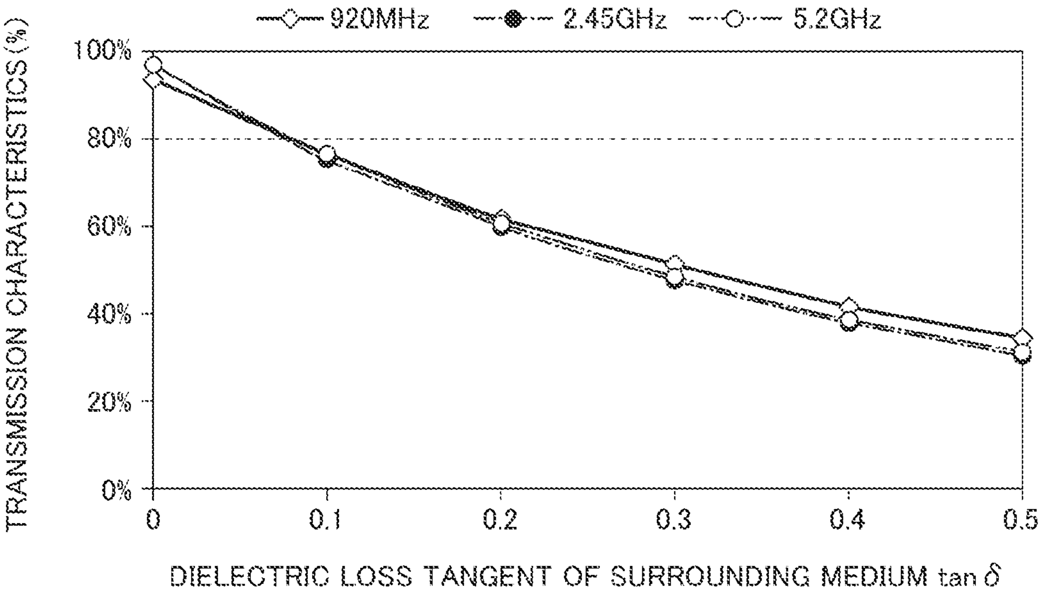
FIG. 6 is a diagram which shows a relationship between a dielectric loss tangent of a surrounding medium and transmission characteristics.

For example, when the dielectric loss tangent of the surrounding environment is 0.1 or more, an efficiency (transmission characteristics) of radio waves is reduced by 20% compared to when the dielectric loss tangent of the surrounding environment is 0) (refer to FIG. 6). In the electric wave transmission device 1 of the first embodiment, since the wiring length of the feeder line A12 is set to 35 mm or less, even if the high-frequency signal flowing through the feeder line A12 undergoes dielectric loss, radio waves with sufficient intensity can be transmitted from the antenna A13.

[Underwater Sensing Device]

Figure 2:
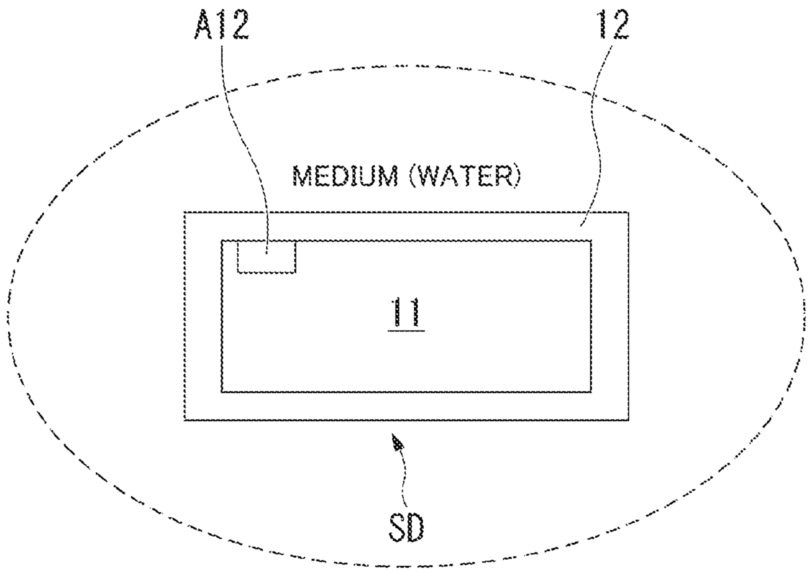
FIG. 2 is a diagram for describing an example of an underwater sensing device to which an electric wave transmission device of the first embodiment is applied.

The electric wave transmission device 1 of the first embodiment shown in FIG. 1 is applicable to, for example, the underwater sensing device SD (refer to FIG. 2).

FIG. 2 is a diagram for describing an example of an underwater sensing device SD to which the electric wave transmission device 1 of the first embodiment is applied.

In the example shown in FIG. 2, the underwater sensing device SD includes an electric wave transmission device 1 (refer to FIG. 1), a signal processing unit (not shown), and a sensor (not shown). The signal processing unit and the sensor are mounted on the circuit board 11A (refer to FIG. 1). The dielectric layer 12 is configured as a protective layer or housing covering the circuit board 11A, the feeder line A12, the antenna A13 (refer to FIG. 1), and so on. The thickness of the dielectric layer 12 is set to 0.5 mm or less. Examples of protective layer materials include, for example, parylene, acrylic resins (for example, polymethylmethacrylate resin: PMMA), silicone resins (for example, dimethylpolysiloxane: PDMS), epoxy resins (for example, copolymers of bisphenol A and epichlorohydrin), glass, and the like.

The underwater sensing device SD performs sensing of the surrounding environment in water (in a medium with high dielectric loss tangent). Specifically, a sensor of the underwater sensing device SD senses temperature, salinity, conductivity, and the like in water, and the signal processing unit processes information sensed by the sensor. The information processed by the signal processing unit is supplied to the antenna A13 via the feeder line A12 as a modulated signal (high-frequency signal) by the high frequency control unit A11, and is transmitted into water as radio waves from the antenna A13. The radio waves transmitted from the antenna A13 are received by the receiver 2 (refer to FIG. 1), and decoded information is used. A distance between the antenna A13 and the receiver 2 is set to 50 cm or less.

Here, the antenna A13 is a wiring antenna A13A (refer to FIG. 3) formed on the circuit board 11A, and the wiring antenna A13A has the same configuration (metal wiring) as the feeder line A12 (that is, the high-frequency signal flowing through the wiring antenna A13A undergoes dielectric loss). For this reason, in the electric wave transmission device 1, a total length of the feeder line A12 and the wiring antenna A13A is set to 35 mm or less.

Figure 3A:
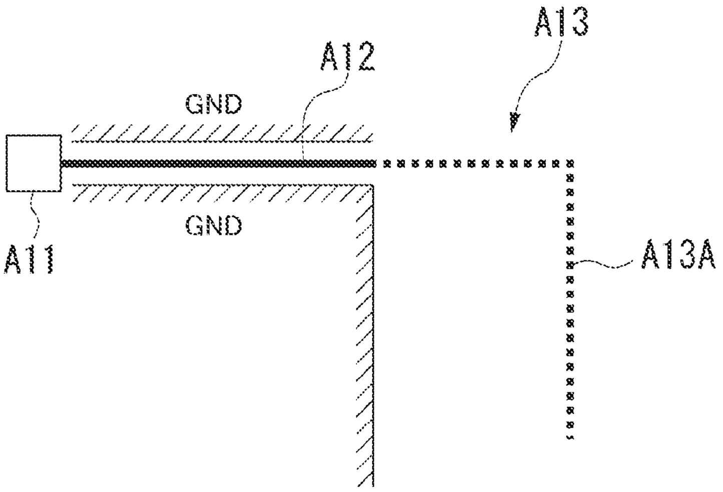
FIGS. 3A and 3B are diagrams which show an example of a relationship between a high frequency control unit, a feeder line, and an antenna of the electric wave transmission device of the first embodiment.
Figure 3B:
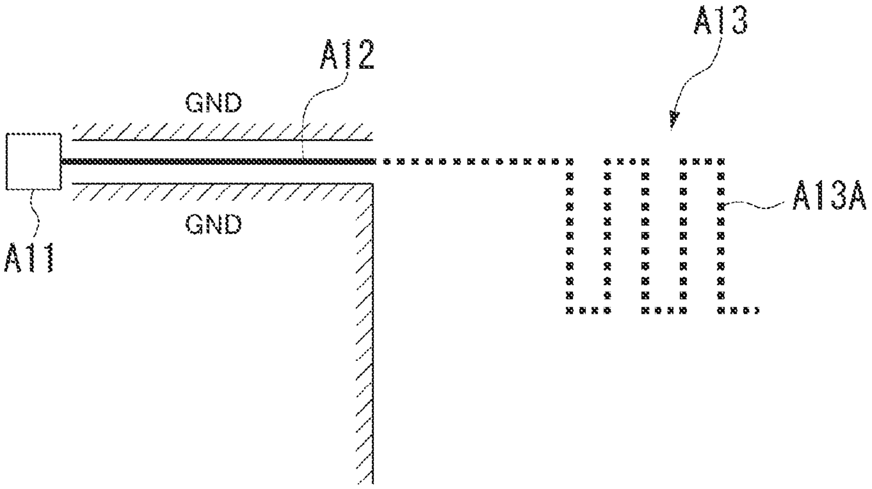

FIGS. 3A and 3B are diagrams which show an example of a relationship between the high frequency control unit A11, the feeder line A12, and the antenna A13 of the electric wave transmission device 1 of the first embodiment. Specifically, FIG. 3A shows a first example of the relationship between the high frequency control unit A11, the feeder line A12, and the antenna A13 of the electric wave transmission device 1 of the first embodiment, and FIG. 3B shows a second example of the relationship between the high frequency control unit A11, the feeder line A12, and the antenna A13 of the electric wave transmission device 1 of the first embodiment.

In the example shown in FIG. 3A, the antenna A13 is configured by an L-shaped wiring antenna A13A formed on the circuit board 11A. In addition, the total length of the feeder line A12 and the L-shaped wiring antenna A13A is set to 35 mm or less.

In the example shown in FIG. 3B, the antenna A13 is configured by a meander-type wiring antenna A13A formed on the circuit board 11A. In addition, the total length of the feeder line A12 and the meander-type wiring antenna A13A is set to 35 mm or less.

Dielectric loss occurs similarly for all wirings through which a high-frequency signal for transmitting radio waves flows. Therefore, as in the examples shown in FIGS. 3A and 3B, in the electric wave transmission device 1 of the first embodiment in which the antenna A13 is configured by the wiring antenna A13A, it must be considered that dielectric loss occurs in the wiring antenna A13A as in the feeder line A12.

Second Embodiment

Hereinafter, a second embodiment of the electric wave transmission device and the wireless communication system of the present invention will be described.

The electric wave transmission device 1 of the second embodiment is configured in the same manner as the electric wave transmission device 1 of the first embodiment described above, except for points that will be described below. Therefore, according to the electric wave transmission device 1 of the second embodiment, the effects similar to those by the electric wave transmission device 1 of the first embodiment described above can be obtained except for the points that will be described below.

In the electric wave transmission device 1 of the second embodiment, the antenna A13 is configured by a wiring antenna A13A (refer to FIG. 4A) formed on the circuit board 11A and a chip antenna A13B (refer to FIG. 4A) containing a high dielectric constant material. In the electric wave transmission device 1 of the second embodiment, a high-frequency signal flows not only through the feeder line A12 but also through the wiring antenna A13A (that is, the high-frequency signal flowing through the wiring antenna A13A undergoes dielectric loss), but since the chip antenna A13B contains a material with a significantly higher relative dielectric constant than a surrounding medium, the high-frequency signal flowing through the chip antenna A13B hardly undergoes dielectric loss due to the surrounding water. For this reason, in the electric wave transmission device 1 of the second embodiment, the total length of the feeder line A12 and the wiring antenna A13A is set to 35 mm or less.

FIGS. 4A and 4B are diagrams which show an example of the relationship between the high frequency control unit A11, the feeder line A12, and the antenna A13 of the electric wave transmission device 1 of the second embodiment. Specifically, FIG. 4A shows a first example of the relationship between the high frequency control unit A11, the feeder line A12, and the antenna A13 of the electric wave transmission device 1 of the second embodiment, and FIG. 4B shows a second example of the relationship between the high frequency control unit A11, the feeder line A12, and the antenna A13 of the electric wave transmission device 1 of the second embodiment.

In the example shown in FIG. 4A, the antenna A13 is configured by an L-shaped wiring antenna A13A formed on the circuit board 11A and a chip antenna A13B containing a high dielectric constant material. In addition, the total length of the feeder line A12 and the L-shaped wiring antenna A13A is set to 35 mm or less.

In the example shown in FIG. 4B, the antenna A13 is configured by a linear wiring antenna A13A formed on the circuit board 11A and a chip antenna A13B containing a high dielectric constant material. In addition, the total length of the feeder line A12 and the L-shaped wiring antenna A13A is set to 35 mm or less.

As described above, dielectric loss occurs similarly for all wirings through which a high-frequency signal for transmitting radio waves flows. Therefore, as in the example shown in FIGS. 4A and 4B, in the electric wave transmission device 1 of the second embodiment, in which the antenna A13 is configured by the wiring antenna A13A and the chip antenna A13B in a complex manner, it must be considered that dielectric loss occurs in the wiring antenna A13A as in the feeder line A12. However, since the chip antenna A13B is generally sealed with a high dielectric constant material, it is desirable to consider both the feeder line A12 and the wiring antenna A13A as targets for dielectric loss when no dielectric loss occurs in the chip antenna A13B.

Normally, it is necessary to achieve high frequency matching between the antenna A13 and the high frequency control unit A11 by modifying a design of the antenna A13 itself or adding a matching circuit consisting of a capacitor and an inductor in a front stage of the antenna A13. At this time, a quality of the matching is evaluated by a voltage standing wave ratio (VSWR), which is generally adjusted between 0 and 5 in many cases. Since this is work of adjusting a return loss to be between 0 db and −3 db, if the dielectric loss due to the feeder line A12 can be suppressed to be −3 db or less, an effect can be suppressed to the same extent as a mismatch that can normally occur. Furthermore, by finely adjusting constants of elements included in the matching circuit, there is a possibility that the dielectric loss due to the feeder line A12 can be canceled. For the above reasons, it is desirable that the dielectric loss due to the feeder line A12 be suppressed to be −3 db or less.

The dielectric loss tangent of water at a frequency of 2.45 GHz is known to be about 0.3.

FIG. 5 is a diagram which shows transmission characteristics (a ratio of electric power supplied to the antenna A13 to an intensity of the high-frequency signal output from the high frequency control unit A11) with respect to the length of the feeder line A12.

As shown in FIG. 5, at a frequency of 2.45 GHz of the high-frequency signal, a decrease in transmittance can be suppressed to 50% or less by setting the length of the feeder line A12 to 15 mm or less (attenuation can be suppressed to −3 db or less). Here, 2.45 GHz is near the center frequency of the 2.4 GHz band, but similarly, by setting the length of the feeder line A12 to 35 mm or less in the 920 MHz band, which is a representative frequency band, and to 7 mm or less in the 5 GHz band, the dielectric loss due to the feeder line can be suppressed to be −3 db or less.

It is desirable that the length of the feeder line be 0.2 mm or more at the shortest in terms of board manufacturing and mounting. As a general example, it is difficult to realize a distance of 0.2 mm or less from an integrated circuit (IC) or a large scale integrated circuit (LSI) having a function of generating a high-frequency signal to an antenna element, which results in an increase in cost.

Third Embodiment

In view of the points described above, in the electric wave transmission device 1 of a third embodiment, the frequency of the high-frequency signal supplied from the high frequency control unit A11 to the antenna A13 via the feeder line A12 is equal to or less than 1 GHZ, and the wiring length of the feeder line A12 is equal to or less than 35 mm. In addition, a thickness of the dielectric layer 12 is equal to or less than 0.2 mm.

The electric wave transmission device 1 of the third embodiment is configured similarly to the electric wave transmission device 1 of the first embodiment except for the points described above.

Fourth Embodiment

Moreover, in the electric wave transmission device 1 of a fourth embodiment, the frequency of the high-frequency signal supplied from the high frequency control unit A11 to the antenna A13 via the feeder line A12 is equal to or less than 2.5 GHz, and the wiring length of the feeder line A12 is equal to or less than 15 mm. In addition, the thickness of the dielectric layer 12 is equal to or less than 0.25 mm.

The electric wave transmission device 1 of the fourth embodiment is configured similarly to the electric wave transmission device 1 of the first embodiment except for the points described above.

Fifth Embodiment

Moreover, in the electric wave transmission device 1 of a fifth embodiment, the frequency of the high-frequency signal supplied from the high frequency control unit A11 to the antenna A13 via the feeder line A12 is equal to or less than 5.5 GHZ, and the wiring length of the feeder line A12 is equal to or less than 7 mm. In addition, the thickness of the dielectric layer 12 is equal to or less than 0.4 mm.

The electric wave transmission device 1 of the fifth embodiment is configured similarly to the electric wave transmission device 1 of the first embodiment except for the points described above.

When a multiband is used, for example, in a case of a device that performs communication using 920 MHz, 2.4 GHZ, and 5 GHz bands together, since the feeder line A12 needs to be designed shorter as the frequency increases, it is desirable to specify the length of the feeder line A12 according to the highest frequency.

As in an application example of the electric wave transmission device 1 of the first embodiment described above, when radio waves are transmitted in water, an attenuation of the radio waves occurs due to conductivity of water, and in addition to dielectric loss of the feeder line, the attenuation of the radio waves is seen in a propagation path in water. Here, it is known that radio waves propagating in water have an attenuation of about −10 db/m. As in the application example of the electric wave transmission device 1 of the first embodiment, in a case of short-distance transmission with an assumed transmission distance of radio waves being equal to or less than 50 cm, an attenuation of high-frequency signals due to dielectric loss becomes more conspicuous than the attenuation of radio waves simply due to the conductivity of the surrounding environment. An effect of limiting the wiring length can be made noticeable using the short-distance transmission.

As mentioned above, the dielectric loss tangent of water is 0.3, but the surrounding environment of the electric wave transmission device 1 is not limited to water. Since the dielectric loss of the feeder line A12 can occur in substances with high dielectric loss tangent, it is desirable to limit the length of the feeder line A12 in all materials with high dielectric loss tangent. As described above, all of water, sea water, an electrolytic solution, the body tissue of an animal or a human body, and the like contain a certain amount of moisture.

FIG. 6 is a diagram which shows a relationship between the dielectric loss tangent of the surrounding medium and the transmission characteristics. Specifically, FIG. 6 shows the relationship between the dielectric loss tangent of the surrounding medium and the transmission characteristics when the length of the feeder line A12 is 35 mm and the frequency of the high-frequency signal is 920 MHz, the relationship between the dielectric loss tangent of the surrounding medium and the transmission characteristics when the length of the feeder line A12 is 15 mm and the frequency of the high-frequency signal is 2.45 GHZ, and the relationship between the dielectric loss tangent of the surrounding medium and the transmission characteristics when the length of the feeder line A12 is 7 mm and the frequency of the high-frequency signal is 5.2 GHZ.

When it is considered that the dielectric loss tangent is proportional to a concentration of a substance, in an environment where a water content of the surrounding medium is about 50%, the dielectric loss tangent is 0.15. At this time, the attenuation of the high-frequency signal due to the dielectric loss of the feeder line A12 can be suppressed to be 20%, and a communication quality of radio waves is not significantly degraded.

In addition, when a substance with high dielectric loss is present in the vicinity of the feeder line A12, the attenuation of the high-frequency signal flowing through the feeder line A12 due to the dielectric loss occurs.

Figure 7A:
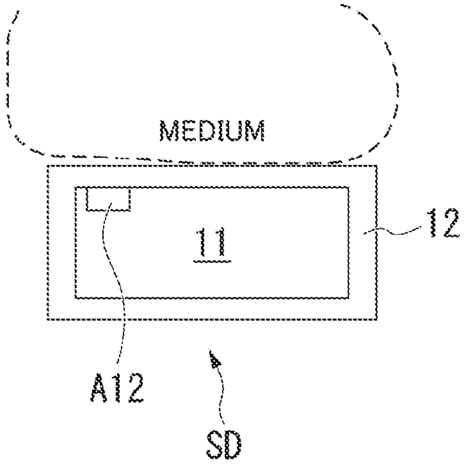
FIGS. 7A and 7B are diagrams which show another application example of the electric wave transmission device of the first to fifth embodiments.
Figure 7B:
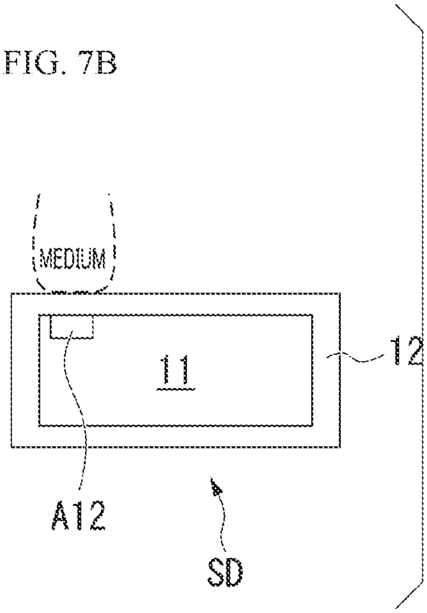

FIGS. 7A and 7B are diagrams which show another application example of the electric wave transmission device 1 of the first to fifth embodiments. Specifically, FIG. 7A shows a state in which the circuit board 11A (refer to FIG. 1) including the feeder line A12 (refer to FIGS. 1, 3A, 3B, and the like) of the electronic device 11 of the electric wave transmission device 1 of the first to fifth embodiments is in contact with a substance with high dielectric loss (the "medium" described above) with the thin dielectric layer 12 interposed therebetween. FIG. 7B shows a state in which only the feeder line A12 of the circuit board 11A of the electronic device 11 of the electric wave transmission device 1 of the first to fifth embodiments is in contact with a substance with high dielectric loss (the "medium" described above) with the thin dielectric layer 12 interposed therebetween.

Furthermore, after the underwater sensing device SD (refer to FIG. 2) is used in water, even in a state where the underwater sensing device SD is lifted out of the water and water adheres to a surface of the underwater sensing device SD, an attenuation due to dielectric loss of the high-frequency signal flowing through the feeder line A12 occurs, similar to the state shown in FIG. 7A or 7B.

In general, a board on which the feeder line is mounted is surrounded by a protective layer or housing for waterproofing and dustproofing. It is desirable that this protective layer or housing be at least partially free of metal and a dielectric to allow radio waves to pass it through. If the protective layer or housing is sufficiently thick and the feeder line is immune to external dielectric loss, there is no need to limit the length of the feeder line.

Figure 8:
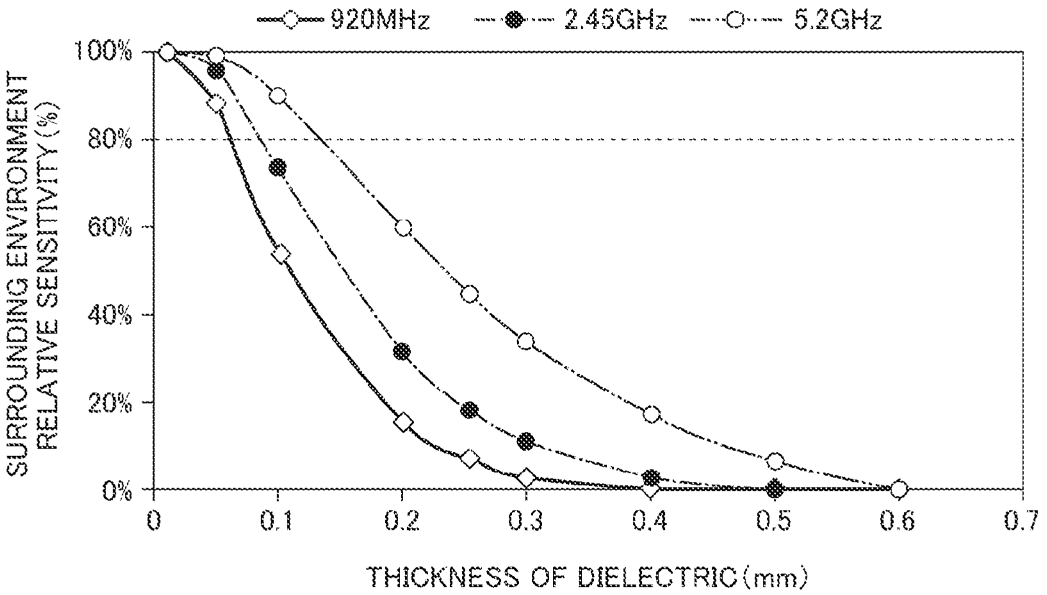
FIG. 8 is a diagram which shows a relationship between a thickness of a dielectric layer and surrounding environment relative sensitivity.

FIG. 8 is a diagram which shows a relationship between the thickness of the dielectric layer 12 and the surrounding environment relative sensitivity. Specifically, FIG. 8 shows a relationship between the thickness of the dielectric layer 12 and the surrounding environment relative sensitivity when the frequency of the high-frequency signal is 920 MHz, a relationship between the thickness of the dielectric layer 12 and the surrounding environment relative sensitivity when the frequency of the high-frequency signal is 2.45 GHZ, and a relationship between the thickness of the dielectric layer 12 and the surrounding environment relative sensitivity when the frequency of the high-frequency signal is 5.2 GHz.

In other words, FIG. 8 shows an effect of the thickness of the dielectric layer 12 on the dielectric loss of the feeder line A12 when the feeder line A12 is sealed by a protective layer or housing configured by the dielectric layer 12 (refer to, for example, FIGS. 2 and 7).

Here, as a general usage scene, a case where the sensing device transmits data to a smartphone or the like will be considered. At this time, when an electric power of 0 dbm is supplied from the high frequency control unit, it is desirable to suppress the dielectric loss of the feeder line to be about −10 db or less to ensure a generally usable propagation distance of about 5 m. Since this is equivalent to an attenuation of 10%, for example, in an example where communication using multiband is performed in the electric wave transmission device 1 of the first and second embodiments, the thickness of the dielectric layer 12 is set to 0.5 mm or less (the thickness of the dielectric layer 12 can be suppressed to 0.5 mm or less).

When the frequency of the high-frequency signal is 920 MHz, in an example to which the present invention is not applied, the thickness of the dielectric layer 12 needs to be set to 0.2 mm or more to cut off the surrounding environment relative sensitivity (a value on the vertical axis in FIG. 8) up to about 20%. On the other hand, in the electric wave transmission device 1 of the third embodiment in which the frequency of the high-frequency signal supplied from the high frequency control unit A11 to the antenna A13 via the feeder line A12 is equal to or less than 1 GHz and the wiring length of the feeder line A12 is equal to or less than 35 mm, the surrounding environment relative sensitivity can be cut off up to about 20% even if the thickness of the dielectric layer 12 is equal to or less than 0.2 mm.

When the frequency of the high-frequency signal is 2.45 GHz, in an example where the present invention is not applied, the thickness of the dielectric layer 12 needs to be set to 0.25 mm or more to cut off the surrounding environment relative sensitivity up to about 20%. On the other hand, in the electric wave transmission device 1 of the fourth embodiment where the frequency of the high-frequency signal supplied from the high frequency control unit A11 to the antenna A13 via the feeder line A12 is equal to or less than 2.5 GHz and the wiring length of the feeder line A12 is equal to or less than 15 mm, the surrounding environment relative sensitivity can be cut off up to about 20% even if the thickness of the dielectric layer 12 is equal to or less than 0.25 mm.

When the frequency of the high-frequency signal is 5.2 GHZ, in an example where the present invention is not applied, the thickness of the dielectric layer 12 needs to be set to 0.4 mm or more to cut off the surrounding environment relative sensitivity up to about 20%. On the other hand, in the electric wave transmission device 1 of the fifth embodiment in which the frequency of the high-frequency signal supplied from the high frequency control unit A11 to the antenna A13 via the feeder line A12 is equal to or less than 5.5 GHz and the wiring length of the feeder line A12 is equal to or less than 7 mm, the surrounding environment relative sensitivity can be cut off up to about 20% even if the thickness of the dielectric layer 12 is equal to or less than 0.4 mm.

That is, in the electric wave transmission devices 1 of the third to fifth embodiments, the thickness of the dielectric layer 12 can be reduced, and the underwater sensing device SD can be decreased in size by applying the electric wave transmission devices 1 of the third to fifth embodiments to the underwater sensing device SD (refer to FIG. 2).

As a wireless communication method of the electric wave transmission device 1 of the first to fifth embodiments, known wireless communication methods such as Bluetooth (a registered trademark), Bluetooth low energy, WiFi, and low power wide area (LPWA) can be applied.

[Capsule-Type Medical Device]

The electric wave transmission device 1 of the first to fifth embodiments is applicable to sensing devices (not shown) enclosed in, for example, endoscope capsules (not shown).

This sensing device incorporates a plurality of sensors such as a camera, a temperature sensor, and a chemical sensor, and is completely scaled so that it does not affect a human body. This sensing device is orally ingested by a patient, senses biometric information in the human body, and transmits it to the outside by radio waves while passing through a route of the digestive system. The device is in contact with the body tissues, submerged in a test subject's internal fluids (saliva, gastric juice, intestinal juice, and the like), or partially floating.

At this time, if a sufficiently thick seal is applied to prevent the dielectric loss of the feeder line A12 (refer to FIGS. 1, 3A, 3B, and the like) (that is, the dielectric layer 12 (refer to FIGS. 1, 2, and the like) is thickened), an overall size of the device may increase, and there is a possibility that the test subject may feel a sense of discomfort, vomiting, or the like.

In the capsule-type medical device (sensing device) to which the electric wave transmission device 1 of the first to fifth embodiments is applied, the thickness of the dielectric layer 12 for sealing can be minimized by performing a design to limit the length of the feeder line A12, and thus it possible to realize a more test subject-friendly capsule-type medical device.

[Sensing Device Attached to Body Surface]

The electric wave transmission device 1 of the first to fifth embodiments can be applied to, for example, a sensing device attached to a body surface.

For example, when the sensing device is used in contact with the human arm or skin, if a sufficiently thick seal is applied to prevent the dielectric loss of the feeder line A12 (refer to FIGS. 1 and 3A and 3B) (that is, the dielectric layer 12 (refer to FIGS. 1, 2, and the like) is thickened), the overall size of the device may increase, and there is a possibility that a user may feel a sense of oppression, discomfort, or the like.

In a sensing device to which the electric wave transmission device 1 of the first to fifth embodiments is applied, by performing the design to limit the length of the feeder line A12, and minimizing the thickness of the dielectric layer 12 for sealing, a more user-friendly sensing device can be realized.

[Wildlife Tracking Device]

The electric wave transmission device 1 of the first to fifth embodiments can be, for example, used for tracking wild animals.

Various sensors are attached to wildlife, including birds such as penguins, mammals such as seals and dolphins, and fish such as carps and sharks to record their ecology and surrounding environmental information. When a device with wireless communication is embedded on a body surface or in a body of a wild animal, if a sufficiently thick seal is applied to prevent the dielectric loss of the feeder line A12 (refer to FIGS. 1, 3A and 3B, and the like) (that is, the dielectric layer 12 (refer to FIGS. 1, 2, and the like) is thickened), the overall size of the device may increase, and there is a possibility that the wild animal may be prevented from performing its intended activities.

In the sensing device (wildlife tracking device) to which the electric wave transmission device 1 of the first to fifth embodiments is applied, the thickness of the dielectric layer 12 for sealing can be minimized by performing a design to limit the length of the feeder line A12, and thus it possible to observe an original living body of living things while minimizing an effect of the sensing device embedded in the body tissue.

In another example, the sensing device to which the electric wave transmission device 1 of the first to fifth embodiments is applied may be used while being embedded in the body tissues of a human body.

In still another example, the sensing device to which the electric wave transmission device 1 of the first to fifth embodiments is applied may be used in a state of being in close proximity to the body tissues of an animal or a human body.

Figure 9:
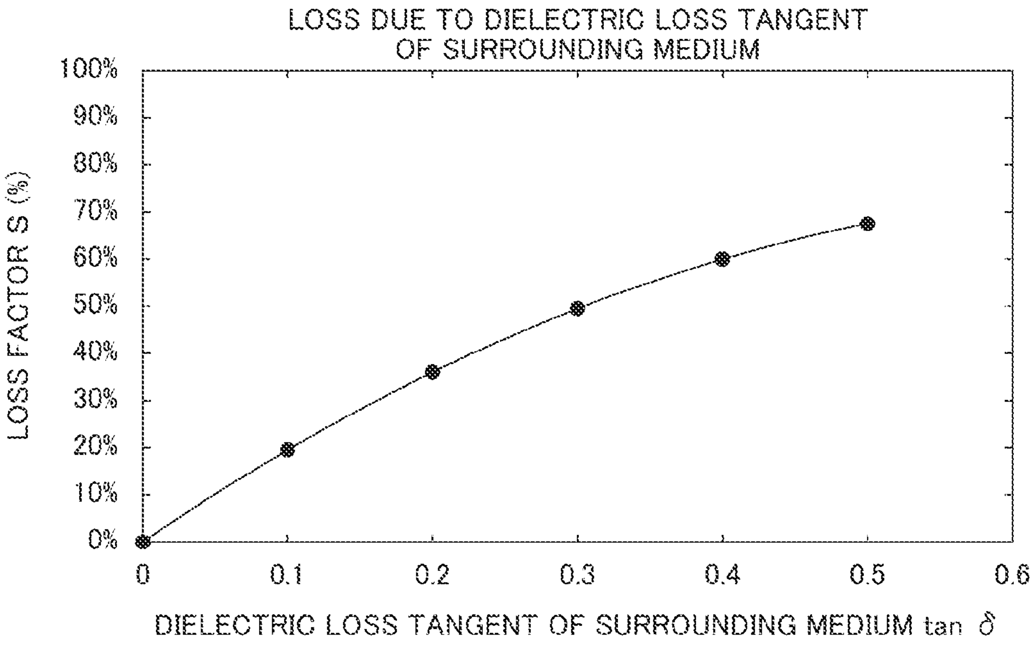
FIG. 9 is a diagram which shows a relationship between a dielectric loss tangent tan δ of the surrounding medium and a loss factor S.

FIG. 9 is a diagram which shows a relationship between a dielectric loss tangent tan δ of the surrounding medium and a loss factor S. The horizontal axis of FIG. 9 indicates the dielectric loss tangent tan δ of the surrounding medium, like the horizontal axis of FIG. 6. The vertical axis of FIG. 9 indicates the loss factor S.

The loss factor S indicates a degree of attenuation of the high-frequency signal flowing through the feeder line A12 after being affected by the surrounding environment, which is water, sea water, an electrolytic solution, or a substance or a tissue containing a certain amount of moisture in the feeder line A12.

As shown in FIGS. 6 and 9, a value of the loss factor S (a value on a vertical axis in FIG. 9) is approximately equal to a value obtained by subtracting a value of the transmission characteristics T (a value on a vertical axis in FIG. 6) from 1.

For this reason, the transmission characteristics T indicate a degree of a supply of the high-frequency signal flowing through the feeder line A12 to the antenna A13 without being attenuated after being affected by the surrounding environment in the feeder line A12.

The present inventors have converted the relationships shown in FIGS. 5, 6, 8, and 9 into mathematical expressions, and obtained the relationships shown in Equations (1) to (3) and the following Equations (4) to (10):

[Math. 4]

$$S = -1.5w^2 + 2.1w \tag{4}$$

[Math. 5]

$$F = 1 + \left(\frac{-1}{1 + a \times e^{b \times t}}\right) \tag{5}$$

[Math. 6]

$$a = \frac{1}{0.0000001\lambda^2 + 0.0004\lambda + 0.01} \tag{6}$$

[Math. 7]

$$b = 0.00017\lambda^2 - 0.08\lambda - 10 \tag{7}$$

[Math. 8]

$$T = \frac{1}{c \times L^2 + d \times L + 1} \tag{8}$$

[Math. 9]

$$c = \frac{1}{0.03\lambda^2 + 0.01\lambda} \tag{9}$$

[Math. 10]

$$d = \frac{1}{-0.0001\lambda^2 + 0.2\lambda} \tag{10}$$

Specifically, Equation (8) is a mathematical expression of the relationship shown in FIG. 5. In Equation (8), T is the transmission characteristics corresponding to a vertical axis in FIG. 5, and L is the length [mm] of the feeder line A12 corresponding to a horizontal axis in FIG. 5. In Equation (8), c is a coefficient, and the coefficient c is represented by Equation (9). In Equation (8), d is a coefficient, and the coefficient d is represented by Equation (10). In Equations (9) and (10), λ is a wavelength of the high-frequency signal flowing through the feeder line A12.

In other words, Equation (8) is obtained by converting a relationship between the transmission characteristics T and a length L of the feeder line A12 exemplified in FIG. 5 using the frequencies of 920 MHZ, 2.45 GHZ, and 5.2 GHZ of the high-frequency signal flowing through the feeder line A12 into an expression using the wavelength λ of the high-frequency signal flowing through the feeder line A12 and generalizing it.

When the frequency of the high-frequency signal flowing through the feeder line A12 is around 2.5 GHZ, the transmission characteristics T and the length L of the feeder line have a relationship shown by Equation (3). That is, when the frequency of the high-frequency signal flowing through the feeder line A12 is around 2.5 GHz, the coefficient c in Equation (8) is 0.0025 and the coefficient d in Equation (8) is 0.04.

In addition, Equation (5) is a mathematical expression of the relationship shown in FIG. 8. In Equation (5), F is the surrounding environment relative sensitivity corresponding to a vertical axis in FIG. 8 (specifically, the effect of the surrounding environment on the high-frequency signal flowing through the feeder line A12), and t is the thickness [mm] of the dielectric layer 12 corresponding to the horizontal axis in FIG. 8. In Equation (5), a is a coefficient, and the coefficient a is represented by Equation (6). In Equation (5), bis a coefficient, and the coefficient b is represented by Equation (7). In Equations (6) and (7), A is the wavelength [mm] of the high-frequency signal flowing through the feeder line A12, as in Equations (9) and (10).

In other words, Equation (5) is obtained by converting the relationship between the surrounding environment relative sensitivity F exemplified in FIG. 8 using the frequencies 920 MHz, 2.45 GHZ, and 5.2 GHz of the high-frequency signal flowing through the feeder line A12 and the thickness t of the dielectric layer 12 into an expression using the wavelength λ of the high-frequency signal flowing through the feeder line A12 and generalizing it.

When the frequency of the high-frequency signal flowing through the feeder line A12 is around 2.5 GHZ, the surrounding environment relative sensitivity F (more specifically, the effect of the surrounding environment on the high-frequency signal flowing through the feeder line A12) and the thickness t of the dielectric layer 12 have the relationship shown by Equation (2). That is, when the frequency of the high-frequency signal flowing through the feeder line A12 is around 2.5 GHZ, the coefficient a in Equation (5) is 9 and the coefficient b in Equation (5) is −18.

Furthermore, Equation (4) is a mathematical expression of a relationship shown in FIG. 9. In Equation (4), S is the loss factor corresponding to the vertical axis in FIG. 9, and w is the dielectric loss tangent tan & of the surrounding medium corresponding to the horizontal axis in FIG. 9.

Sixth Embodiment

The electric wave transmission device 1 of a sixth embodiment is configured similarly to the electric wave transmission devices 1 of the first to fifth embodiments described above, except for the points which will be described below. Therefore, according to the electric wave transmission device 1 of the sixth embodiment, effects similar to those of the electric wave transmission devices 1 of the first to fifth embodiments described above can be obtained except for points which will be described below.

In the electric wave transmission device 1 of the sixth embodiment, the length L of the feeder line A12 and the thickness t of the dielectric layer 12 are set so that the transmission characteristics T indicating a degree of the supply of the high-frequency signal flowing through the feeder line A12 to the antenna A13 without being attenuated after being affected by the surrounding environment in the feeder line A12, the loss factor S indicating a degree of the attenuation of the high-frequency signal flowing through the feeder line A12 after being affected by the surrounding environment in the feeder line A12, and the surrounding environment relative sensitivity F have the relationship shown in Equation (1).

In one example of the electric wave transmission device 1 of the sixth embodiment, the thickness t of the dielectric layer 12 is set to 0.6 mm or less, the wavelength λ of the high-frequency signal flowing through the feeder line A12 is set to 400 mm or less, and the wiring length (length L) of the feeder line A12 is set to 50 mm or less.

When the electric wave transmission device 1 of the sixth embodiment is applied to the wireless communication system WS, the wireless communication system WS has the receiver 2 that receives radio waves transmitted from the antenna A13, and the distance between the antenna A13 and the receiver 2 is set to 50 cm or less.

As described above, a mode for implementing the present invention has been described using the embodiments, but the present invention is not limited to such embodiments, and various modifications and replacements can be made within a range not departing from the gist of the present invention. Configurations as described in each embodiment and each example described above may also be combined.

The invention claimed is:

1. An electric wave transmission device that includes an electronic device having a circuit board on which an electric wave transmission circuit is formed and a dielectric layer, and is covered with the dielectric layer wherein the electric wave transmission circuit has a high frequency control unit, a feeder line, and an antenna, the high frequency control unit supplies a high-frequency signal in one or more frequency bands to the antenna via the feeder line, the feeder line and the antenna are covered with the dielectric layer, the dielectric layer has a thickness of 0.5 mm or less, and protects the electric wave transmission device such that the electric wave transmission device is in a usable state while being in contact with a surrounding environment that is an environment containing water, sea water, an electrolytic solution, or a substance or a tissue containing a certain amount of moisture, and in which a dielectric loss tangent at a frequency of the radio waves is equal to or more than 0.1, and a wiring length of the feeder line is equal to or less than 35 mm.

2. The electric wave transmission device according to claim 1, wherein the substance or the tissue containing a certain amount of moisture contains 50% or more of moisture.

3. The electric wave transmission device according to claim 1, wherein the electric wave transmission device is used in a state of being in close proximity to the body tissue of an animal or a human body or in a state of being embedded in the body tissue of an animal or a human body.

4. The electric wave transmission device according to claim 1, wherein a frequency of a high-frequency signal supplied from the high frequency control unit to the antenna via the feeder line is equal to or less than 1 GHz.

5. The electric wave transmission device according to claim 4, wherein the thickness of the dielectric layer is equal to or less than 0.2 mm.

6. The electric wave transmission device according to claim 1, wherein the frequency of the high-frequency signal supplied from the high frequency control unit to the antenna via the feeder line is equal to or less than 2.5 GHZ, and the wiring length of the feeder line is equal to or less than 15 mm.

7. The electric wave transmission device according to claim 6, wherein the thickness of the dielectric layer is equal to or less than 0.25 mm.

8. An electric wave transmission device that includes an electronic device having a circuit board on which an electric wave transmission circuit is formed and a dielectric layer, and is covered with the dielectric layer, wherein the electric wave transmission circuit has a high frequency control unit, a feeder line, and an antenna, the high frequency control unit supplies a high-frequency signal in one or more frequency bands to the antenna via the feeder line, the feeder line and the antenna are covered with the dielectric layer, the dielectric layer has a thickness of 0.5 mm or less, and protects the electric wave transmission device such that the electric wave transmission device is in a usable state while being in contact with a surrounding environment that is an environment containing water, sea water, an electrolytic solution, or a substance or a tissue containing a certain amount of moisture, and in which a dielectric loss tangent at a frequency of the radio waves is equal to or more than 0.1, and transmission characteristics T indicating a degree of a supply of the high-frequency signal flowing through the feeder line to the antenna without being attenuated after being affected by a surrounding environment in the feeder line, a loss factor S indicating a degree of attenuation of the high-frequency signal flowing through the feeder line after being affected by a surrounding environment in the feeder line, and a surrounding environment relative sensitivity F have a relationship shown by the following Equation (1):

[Math. 1]

$$T \geq \frac{S \times F}{4}. \tag{1}$$

9. The electric wave transmission device according to claim 8, wherein the thickness of the dielectric layer is equal to or less than 0.6 mm, a wavelength of the high-frequency signal flowing through the feeder line is equal to or less than 400 mm, and a wiring length of the feeder line is equal to or less than 50 mm.

10. The electric wave transmission device according to claim 8, wherein, when the frequency of the high-frequency signal flowing through the feeder line is around 2.5 GHZ, the surrounding environment relative sensitivity F and a thickness t of the dielectric layer have a relationship shown by the following Equation (2), and the transmission characteristics T and a length L of the feeder line have a relationship shown by the following Equation (3).

[Math. 2]

$$F = 1 + \left( \frac{-1}{1 + 9e^{-18 \times t}} \right) \tag{2}$$

[Math. 3]

$$T = \frac{1}{0.0025L^2 + 0.04L + 1}. \tag{3}$$

11. A wireless communication system comprising:

the electric wave transmission device according to claim 8; and a receiver configured to receive radio waves transmitted from the antenna, wherein a distance between the antenna and the receiver is equal to or less than 50 cm.

* * * * *